(12) United States Patent
Wastell et al.

(10) Patent No.: US 11,925,186 B2
(45) Date of Patent: Mar. 12, 2024

(54) FISH HEAD CUTTING MACHINE

(71) Applicant: Pisces Fish Machinery, Inc., Wells, MI (US)

(72) Inventors: Trevor T. Wastell, Gladstone, MI (US); Andrew Lambert, Wells, MI (US)

( * ) Notice: Subject to any disclaimer, the term of this patent is extended or adjusted under 35 U.S.C. 154(b) by 123 days.

(21) Appl. No.: 17/837,282

(22) Filed: Jun. 10, 2022

(65) Prior Publication Data
US 2022/0394985 A1 Dec. 15, 2022

Related U.S. Application Data

(60) Provisional application No. 63/210,418, filed on Jun. 14, 2021.

(51) Int. Cl.
*A22C 25/00* (2006.01)
*A22C 25/14* (2006.01)

(52) U.S. Cl.
CPC .......... *A22C 25/142* (2013.01); *A22C 25/145* (2013.01)

(58) Field of Classification Search
CPC ..... A22C 25/142; A22C 25/145; A22C 25/08; B65G 2201/0202; B65G 17/12
USPC ......................................... 452/160–163, 165
See application file for complete search history.

(56) References Cited

U.S. PATENT DOCUMENTS

| | | |
|---|---|---|
| 2,081,697 A | 11/1960 | Schlichting |
| 3,461,485 A | 8/1969 | Crepeau |
| 3,838,478 A * | 10/1974 | Wulff ..................... A22C 25/08 452/119 |
| 3,885,270 A | 5/1975 | Dohrendorf |
| 3,972,091 A | 8/1976 | Dohrendorf |
| 4,170,806 A | 10/1979 | Pettersson |
| 4,389,750 A | 6/1983 | Kristinsson et al. |

(Continued)

FOREIGN PATENT DOCUMENTS

WO 9913731 3/1999

OTHER PUBLICATIONS

European Search Report and Opinion dated Nov. 30, 2022 issued by the European Patent Office in the corresponding European Patent Application No. EP22178780.7, 11 pages.

*Primary Examiner* — Richard T Price, Jr.
(74) *Attorney, Agent, or Firm* — Wozny IP Law; Thomas M. Wozny (57) ABSTRACT

A fish head cutting machine for decapitating a fish, comprising: a) a fish support for supporting a fish in an infeed loading zone with its belly side down and its backbone in a substantially horizontal orientation; b) a guide mechanism positioned adjacent the fish support to hold the fish via an anatomical body part, such as its gill plate, collar bone, pectoral fin or pelvic fin, so that only the body of the fish is supported by the fish support; c) a drive mechanism transporting the fish in a downward direction and at an acute angle to vertical from the infeed loading zone downstream to a head cutting zone while the fish is supported on the fish support and held by the guide mechanism; d) a head pusher located between the infeed loading zone and the head cutting zone that engages the head of the fish and tips the head of the fish upwardly and rearwardly as the fish moves downstream to the head cutting zone; and e) head cutting blades located downstream of the head pusher in the cutting zone that cut the head of the fish from the body of the fish.

20 Claims, 10 Drawing Sheets

(56) References Cited

U.S. PATENT DOCUMENTS

| | | | |
|---|---|---|---|
| 4,601,083 A | | 7/1986 | Shoji et al. |
| 4,635,318 A | | 1/1987 | Braeger et al. |
| 5,135,735 A | * | 8/1992 | Schrader ............ A61K 51/0431 |
| | | | 252/644 |
| 5,358,441 A | | 10/1994 | Hjorth |
| 5,480,347 A | | 1/1996 | Hicks |
| 5,591,076 A | | 1/1997 | Evers et al. |
| 7,179,163 B1 | * | 2/2007 | Vedsted ................ A22C 25/14 |
| | | | 452/121 |
| 10,555,540 B2 | | 2/2020 | Svoldgaard et al. |

\* cited by examiner

FISH HEAD CUTTING MACHINE

BACKGROUND OF THE INVENTION

The present invention relates to fish processing machinery, and more specifically to an apparatus and method for heading or decapitating fish.

When filleting a fish by automatic machine it is usually necessary to remove the head before introducing the body of the fish into the filleting machine. When removing the head from the body it is desirable that the minimum of usable flesh be removed with the head but is rather left on the body of the fish for the maximum meat recovery for the fillet. It is generally recognized that the most efficient method to achieve this is by a v-cut that captures the flesh inside the head behind the collar bone and that this v-cut be at an angle relative to the collarbone.

It is also known that the nose of the fish should be tipped back to allow capture of the flesh above and on top of the collar bone. See for example U.S. Pat. No. 2,961,697 dated November 1960 to Schlichting and U.S. Pat. No. 4,635,318 dated January 1987 to Braeger et al.

This method is common in the industry but fish heading machines typically lay a fish on its side for transportation past the v-cut blades, and have limited size range operating capability as the center point of the fish, where the center of the blades must cut, varies in relation to the backbone position according to the girth of the fish, causing the cut to be off center. There are also machines where the fish is hung by the gill plate on a locating mechanism and carried past the blades by narrow spiked belts, but in such machines the weight of the fish determines the angle that the fish passes through the blades as there is no control of the body of the fish. An additional problem is that the spiked belts are hazardous to the operator especially on smaller fish. Most machines currently available for fish larger than 1 Kg. are also standalone units, which require additional operators to load the fish into subsequent downstream machines in the fish filleting process.

SUMMARY OF THE INVENTION

The fish head cutting machine of the present invention provides numerous advantages, such as, for example, a fish decapitation machine that will 1) precisely locate the v-cut by using a fish anatomical body part, such as the gill plate, the collar bone, the pectoral fin or the pelvic fin, and thus provide the ideal location for the head cut to result in optimum yield of meat for a wide size range of fish and fish species; 2) control the angle of transportation of the fish past the blades by having complete control of the body of the fish; 3) ensure correct centering of a fish through the head cutting blades over a wide size range of different fish species; 4) tip the head of the fish back during the cutting operation in order to obtain maximum meat recovery from the top of the head; 5) be safe and easy for the operator to load; and which, (6) due to the speed of operation being controlled by a programmable logic computer (PLC), can be interfaced and synchronized with the operation of subsequent eviscerating and/or filleting machines to thus provide a fully automatic fish decapitating and filleting system, loaded by just one operator, for a variety of fish sizes and species.

In order to accomplish the above advantages, the fish head cutting machine of the present invention utilizes the following features:

a) decapitating a fish using a v-cut method, and locating the fish on an anatomical body part, such as its gill plate, collar bone, pectoral fin or pelvic fin, where the fish is fed upright and belly down, not on its side or hung by its gill plate, and is therefore always centrally located with respect to the blades, irrespective of size and/or girth of the fish;

b) control of the complete body of the fish in a pair of conveyor timing belts ensuring the body of the fish is at the correct angle for an optimum yield head cut;

c) a light curtain to control the cycle of the operation without input from an operator other than to initiate and terminate power for increased safety of operation;

d) supporting the fish on locating bosses that are formed integral with a pair of conveyor belts to maintain the correct angle when driving the fish past the v-cutting blades;

e) the ability to adjust the location of the fish locating bosses to allow various sizes of fish to be correctly positioned below the light curtain;

f) the ability to adjust of the distance or gap between the drive belt infeed rollers, and thus the distance or gap between the conveyor belts themselves, by a linear actuator via the PLC, to accommodate various sizes of fish;

g) the ability to adjust the pressure exerted on the fish head pusher system by an air cylinder, rather than a spring, which is controllable via the PLC, depending on the size and species of fish being processed;

h) ensuring the constant control and positioning of the location bosses by homing at proximity sensors; and i) positioning a fish to exit the head cutting operation with its belly down and head end leading at a programmable controlled rate to allow feeding to subsequent fish processing machines, such as eviscerating and filleting machines.

Thus, the present invention provides a fish head cutting machine for decapitating a fish, comprising: a) a fish support for supporting a fish in an infeed loading zone belly side down and its backbone in a substantially horizontal orientation; b) a guide mechanism positioned adjacent the fish support to hold the fish via an anatomical body part such as its gill plate, collar bone, pectoral fin or pelvic fin, so that only the body of the fish is supported by the fish support; c) a drive mechanism transporting the fish in a downward direction and at an acute angle to vertical from the infeed loading zone downstream to a head cutting zone while the fish is supported by the fish support and held by the guide mechanism; d) a head pusher located between the infeed loading zone and the head cutting zone that engages the head of the fish and tips the head of the fish upwardly and rearwardly as the fish moves downstream; and e) head cutting blades located downstream of the head pusher in the head cutting zone that cut the head of the fish from the body of the fish.

The present invention also provides a method of decapitating a fish, comprising the steps of a) supporting a fish in an infeed loading zone on a fish support with its belly side down and its backbone in a substantially horizontal orientation; b) guiding the fish by gripping the fish via an anatomical body part such as its gill plate, collar bone, pectoral fin or pelvic fin, so that only the body of the fish is supported by the fish support; c) b) driving the fish in a downward direction and at an acute angle to vertical from the infeed loading zone downstream to a head cutting zone while the fish is held by its anatomical body part and supported by the fish support; c) pushing the head of the fish upwardly and rearwardly as the fish travels downstream from the infeed loading zone to the head cutting zone; and
d) cutting the head of the fish from the body of the fish in the head cutting zone.

BRIEF DESCRIPTION OF THE DRAWINGS

FIG. 9b is a side view of the head cutting section of the machine illustrated in FIG. 9a;

FIG. 10b is a side view of the fish head cutting and fish filleting machines of FIG. 10a; and FIG. 10c is an end view of the fish head cutting and fish filleting machines of FIG. 10a.

DETAILED DESCRIPTION OF THE INVENTION

Figure 1A:
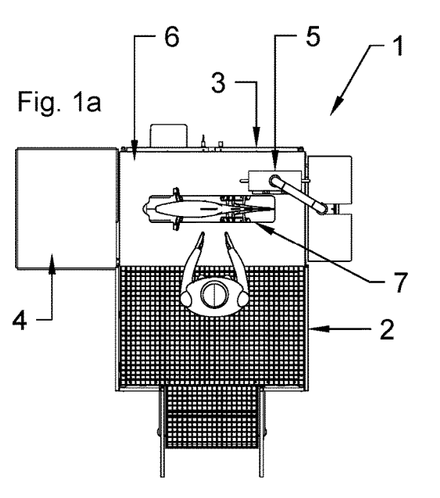
FIG. 1a is a top plan view of a fish head cutting machine constructed in accordance with the present invention.
Figure 1B:
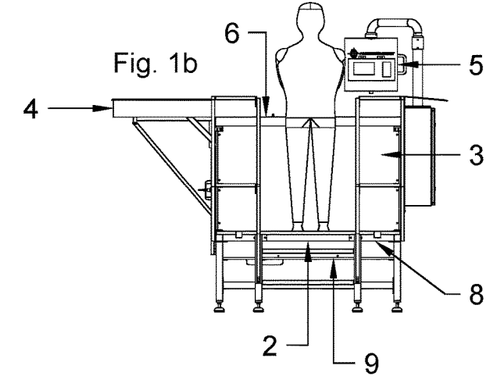
FIG. 1b is a side elevation view of the fish head cutting machine of FIG. 1.
Figure 1C:
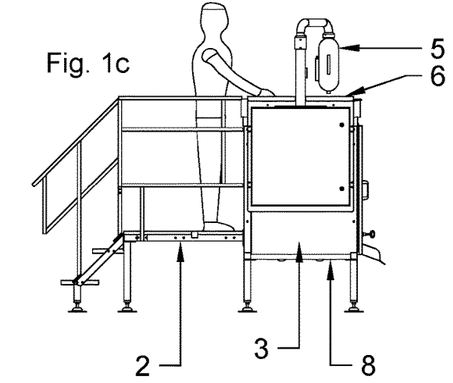
FIG. 1c is an end view of the fish head cutting machine of FIG. 1.

Referring to the drawings, FIGS. 1a, 1b and 1c illustrate a fish head cutting machine generally designated by the numeral 1. The head cutting machine 1 includes an operator platform 2, a head cutting section 3, a feed tray 4, and a programmable logic controller 5. The head cutting section 3 includes an upper end 6 having a feed inlet opening 7 leading to a fish infeed loading zone 60, and a lower end 8 having a fish head cutting zone 61 leading to a discharge outlet opening 9. The operator platform 2 is raised up from a floor in order to accommodate feeding fish into the inlet opening 7 at the upper end 6 of the head cutting section 3. A fish is not fed vertically or on its side into the head cutting section 3 of machine 1, but instead, as illustrated in the drawings, a fish is fed in an upright, belly-side down and with its backbone in a substantially horizontal orientation or configuration into the infeed loading zone 60 of the head cutting section 3. The entire fish then travels downstream from the infeed loading zone 60 to the head cutting zone 61 while remaining in this substantially upright and horizontal orientation. The entire horizontally positioned fish is driven downwardly at an acute angle to vertical of about 6-14 degrees, more preferably about 8-12 degrees, and most preferably about 10 degrees, inside of the head cutting section 3 to be decapitated, as will hereinafter be described. The head and body of the fish thus move downwardly and away from a vertical plane that extends perpendicular to the direction of travel, and at an acute angle to that vertical plane, as the fish moves downstream between the infeed loading zone 60 and the head cutting zone 61 of the head cutting section 3 of machine 1.

The downward movement of the horizontally orientated fish "at an acute angle to vertical" is best seen in FIGS. 2d, 4a, 7d, 8a and 9b. As illustrated therein, the fish travels downwardly from the infeed loading zone 60 to the head cutting zone 61 in a horizontal orientation along a first vertical plane which is not only parallel to but also extends through the backbone of the fish. Thus, any fish body part, and in fact any point on the fish itself, would move downwardly along a substantially straight line in the first vertical plane. This substantially straight line would extend parallel to the outer edges of the conveyor belts 13 and 14 shown in FIGS. 2d, 4a, 7d, 8a and 9b and would thus intersect a second vertical plane which is orientated perpendicular to the first vertical plane at an acute angle. This second vertical plane is orientated parallel to the left and right frame members of the head cutting section 3 shown in FIG. 7c. Thus, the fish travels downwardly and away from the second vertical plane, and that direction of travel is at an acute angle with respect to the second vertical plane.

Figure 2A:
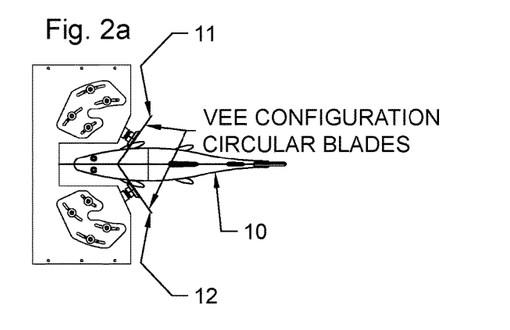
FIG. 2a is a top plan view illustrating circular blades arranged to provide a v-cut to remove the head of a fish.
Figure 2B:
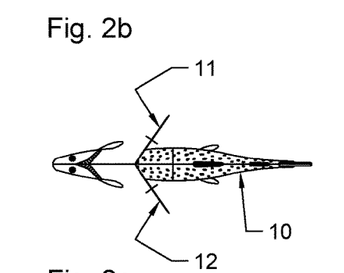
FIG. 2b is a top plan view of a headed fish.
Figure 2C:
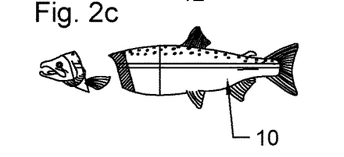
FIG. 2c is a side view of the headed fish of FIG. 2b.

FIGS. 2a, 2b and 2c illustrate the desired v-cut for decapitating a fish 10. As is well known in this art, two rotating head cutting blades 11 and 12 are angularly positioned in a v-configuration to slice into opposite sides of the head of fish 10, and behind the collar bone of fish 10. Blades 11 and 12 are typically nine inches in diameter, and their v-configuration is adjustable to provide a v-cut angle of between 90 degrees and 130 degrees depending on the species of fish being processed.

Figure 2D:
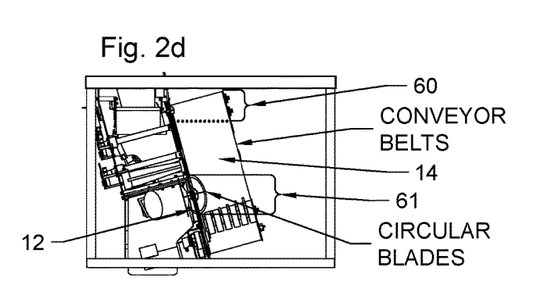
FIG. 2d is a side elevation view of the fish head cutting section of the machine.
Figure 2E:
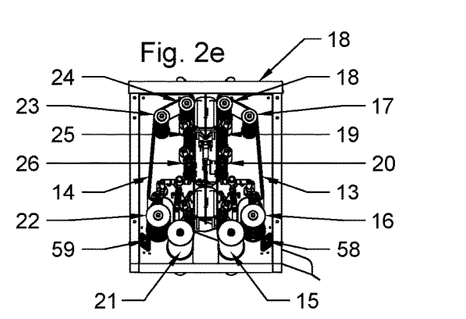
FIG. 2e is a top plan view of the fish head cutting section shown in FIG. 2d.
Figure 5:
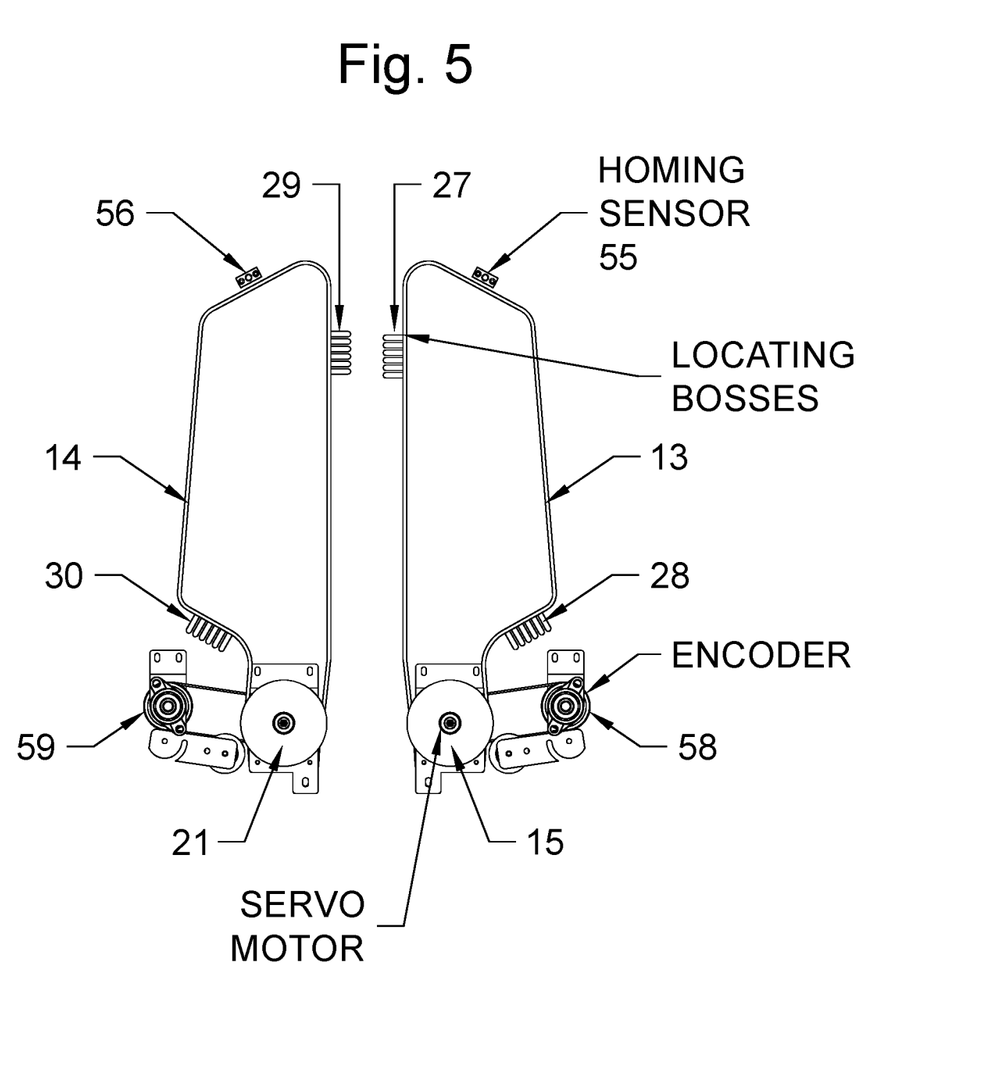
FIG. 5 is an enlarged end view of the conveyor belts illustrating components for indexing and homing the belts.

FIGS. 2d and 2e illustrate various components within the head cutting section 3 of machine 1, as well as their locations respective to one another. More specifically, head cutting section 3 includes a pair of endless fish conveying belts 13 and 14 that are spaced apart, as best seen in FIG. 5, to provide a gap for receiving a fish to be decapitated therebetween, and are used to grip the entire body of the fish and transport the fish downstream past the two head cutting blades 11 and 12. The belts 13 and 14 are disposed in an upward and angular orientation so that the outer edges thereof extend at an acute angle to vertical, as noted previously herein. Belt 13 has a plurality of dimples formed on its outer surface to aid in gripping the fish, and a plurality of raised ridges extending widthwise across its inner surface which intermesh with ridges on a servo motor 15. Servo motor 15 is used to drive belt 13 over idler rollers 16, 17 and 18 as well as infeed rollers 19 and 20. Belt 14 is similarly constructed and is driven by servo motor 21 over idler rollers 22, 23 and 24 as well as infeed rollers 25 and 26.

Figure 4A:
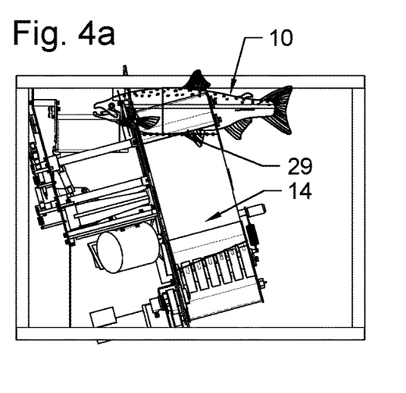
FIG. 4a is a side view in elevation of the fish head cutting section of the machine with a fish located within an infeed zone and ready to be headed.
Figure 4B:
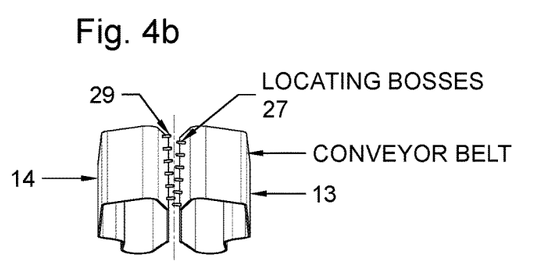
FIG. 4b is a perspective view of the conveyor belts and fish locating bosses used to transport the fish to the v-cutting blades.
Figure 4C:
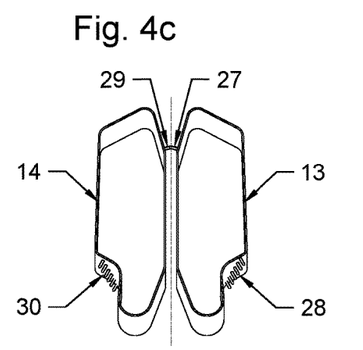
FIG. 4c is an end view of the conveyor belts shown in FIG. 4b.

As shown best in FIGS. 2d, 4b, 4c and 5, belt 13 has a pair of fish locating bosses 27 and 28 in the form of a series of nipples projecting from, and spaced widthwise across, its outer surface. The bosses 27 and 28 are equally spaced from each other along the length of belt 13 so that when belt 13 is driven through its first cutting cycle the bosses 27 are moved from their upper position to the lower position of bosses 28, as shown in FIG. 5, and the bosses 28 are moved from their lower position to the upper position of bosses 27, as shown in FIG. 5. Bosses 27 and 28 continue to exchange upper and lower positions every time belt 13 is driven through a cutting cycle by servo motor 15. Likewise, belt 14 is constructed in the same manner as belt 13, and also has fish locating upper bosses 29 and lower bosses 30 projecting therefrom. As seen in FIG. 5, the upper bosses 29 of belt 14 are positioned directly opposite of the upper bosses 27 of belt 13 (or alternately bosses 30 of belt 14 might be positioned directly opposite of the bosses 28 of belt 13) at the initiation of a cutting cycle in order to provide a fish support and properly position the fish to be decapitated in an upright, belly-side down and substantially horizontal orientation, as shown in FIG. 4a. Belt 14 moves through cutting cycles in the same manner as belt 13 when driven by servo motor 21. FIG. 4a also shows the fish 10 in its upright, belly-side down and substantially horizontal orientation within the infeed loading zone 60.

Figure 3A:
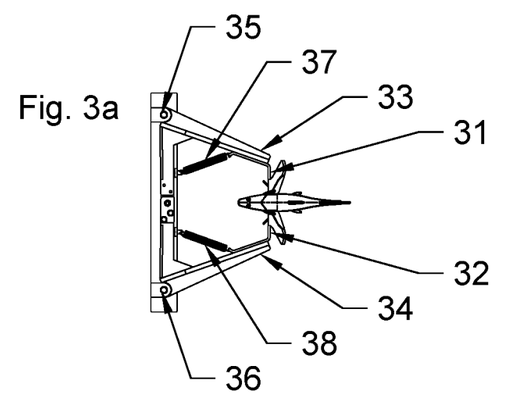
FIG. 3a is a top plan view of a pair of spring-loaded guide plates in their closed positions gripping a small fish behind its gill plate to position the fish with respect to the circular blades.
Figure 3B:
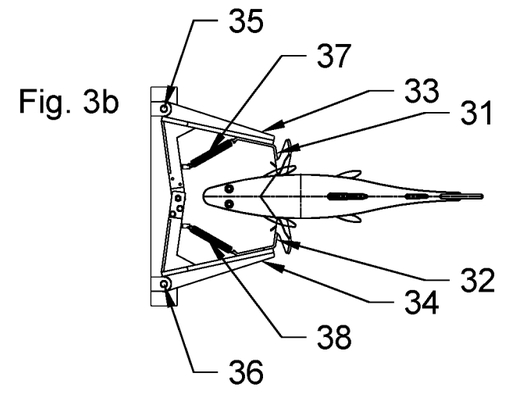
FIG. 3b is a top plan view of the spring-loaded guide plates in their closed positions gripping a large fish behind its gill plate to position the fish with respect to the circular blades.
Figure 3C:
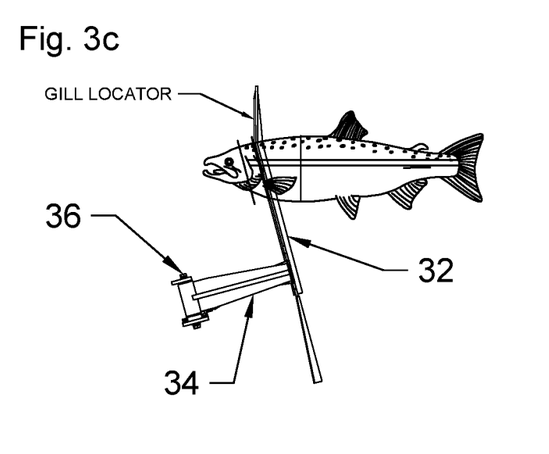
FIG. 3c is a side view of the spring-loaded guide plates and fish of FIG. 3b.

The head cutting section 3 of machine 1 also includes a guide mechanism that ensures the body of the fish always stays central to the v-cutting blades 11 and 12 so that the v-cut is in the correct location behind the collarbone irrespective of the length and girth of the fish. As illustrated in FIGS. 3a, 3b and 3c, this guide mechanism comprises a pair of opposing spring-biased L-shaped guide plates 31 and 32 which grip opposite sides of a fish at the desired fish anatomical body part. The guide plates 31 and 32 extend vertically from the upper infeed loading zone of the head cutting section 3 to just above the cutting blades 11 and 12 and function together to ensure the body of the fish always remains central to the blades 11 and 12. To accomplish this function, the guide plates 31 and 32 are connected to arms 33 and 34, respectively, which in turn are pivotally mounted via pins 35 and 36, respectively, to the frame of machine 1. Guide plates 31 and 32 are thus movable between a closed fish gripping position and an open fish non-gripping position. Springs 37 and 38 bias the inner edges of the guide plates 31 and 32 to the closed position, but permit the guide plates 31 and 32 to be moved between a relatively closed position of about two inches to accommodate a smaller fish, as shown in FIG. 3a, and a relatively more open position of about five or six inches to accommodate a larger fish, as shown in FIG. 3b.

FIGS. 3a, 3b and 3c illustrate guide plates 31 and 32 gripping the gill plates on opposite sides of a fish. However, in addition to a fish's gill plates, guide plates 31 and 32 could also be located on other anatomical fish body parts such as the collar bone, pectoral fin or pelvic fin. The location of guide plates 31 and 32 depend not only on the fish species being processed through the heading machine, but also may depend on the desired shape and form of the final finished fillet which is ultimately cut from the headed fish. For example, on some fish with a dominant pectoral fin such as cod, haddock or striped bass, it may be desirable for the ultimate fish fillet to have the pectoral fin left on the fillet so in that case the guide plates 31 and 32 would locate on the gill plate so the pectoral fin is not cut off with the head but instead remains on the body of the fish after heading. For other types of fillets, it might be desirable to not have the pectoral fin on the ultimate fillet so in that case the guide plates 31 and 32 would locate on the pectoral fin to thus remove the pectoral fin with the head of the fish. Also, for some fish like the salmonids, such as salmon, trout, arctic char, or whitefish, the guide plates 31 and 32 would usually be located on the collar bone. For other fish such as farmed sea bass, sea bream or tilapia, the guide plates 31 and 32 would usually be located on the gill plate. Thus, any of several fish anatomical body parts such as the gill plate, the collar bone, the pectoral fin or the pelvic fin could be used to properly position the fish for the desired heading operation.

Figure 6A:
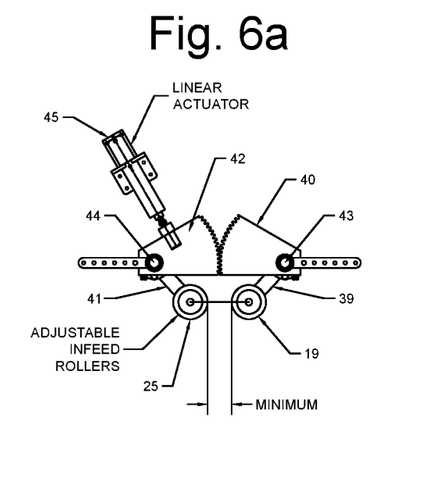
FIG. 6a is an end view of the adjustable infeed rollers illustrating a minimum gap for use with small fish.
Figure 6B:
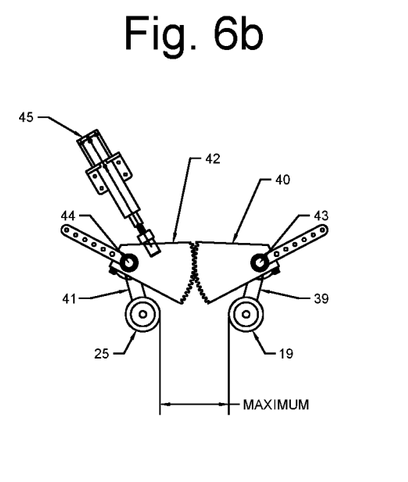
FIG. 6b is an end view of the adjustable infeed rollers illustrating a maximum gap for use with large fish.
Figure 6C:
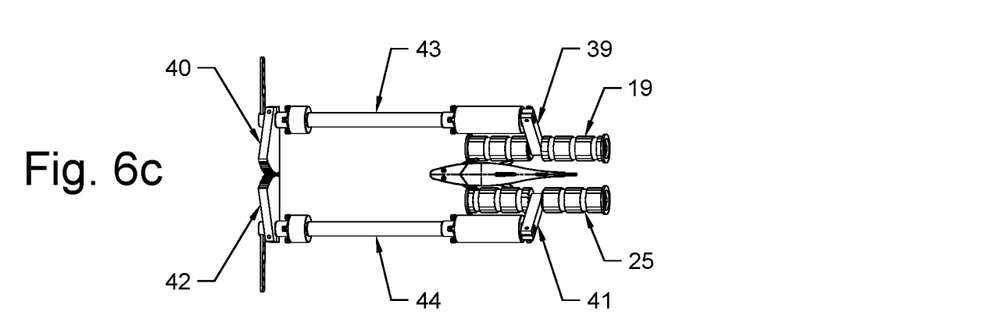
FIG. 6c is a top plan view of the infeed rollers of FIG. 6a illustrating a small fish between the rollers.
Figure 6D:
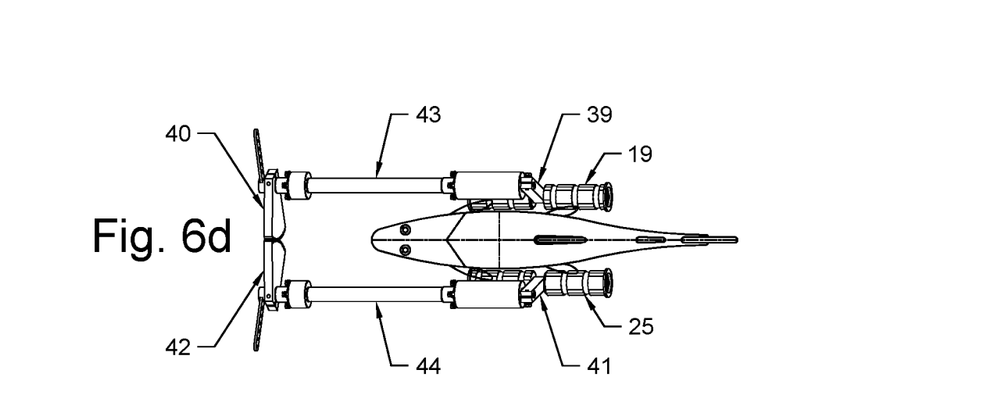
FIG. 6d is a top plan view of the infeed rollers of FIG. 6b illustrating a large fish between the rollers.

As shown best in FIG. 5, there is a gap or spacing between conveying belts 13 and 14. The width of this gap or spacing is adjustable between a minimum of about 1.75 inches in order to grip and drive smaller fish to the cutting blades 11 and 12, as shown in FIGS. 6a and 6c, and a maximum of about five or six inches in order to grip and drive larger fish to the blades 11 and 12, as shown in FIGS. 6b and 6d. To accomplish this adjustment, the head cutting section 3 of machine 1 includes the adjustable infeed rollers 19 and 20. Infeed roller 19 is connected to an arm 39 which in turn is connected to an infeed gear 40, and infeed roller 20 is connected to an arm 41 which in turn is connected to an infeed gear 42. Gear 40, arm 39 and roller 19 are all pivotally mounted to the frame of machine 1 via a pin 43, and gear 42, arm 41 and roller 20 are all pivotally mounted to the frame of machine 1 via a pin 44. A linear actuator 45 is connected to the gear 42, and the teeth of gear 42 intermesh with the teeth of gear 40. Accordingly, when the rod of actuator 45 is extended, as shown in FIG. 6b, the width of the gap or space between rollers 19 and 20 is increased, and when the rod of actuator 45 is retracted, as shown in FIG. 6a, the width of the gap or spacing between rollers 19 and 20 is decreased. As a result, since infeed rollers 19 and 20 engage the inner surfaces of belts 13 and 14, respectively, the width of the gap or spacing between conveying belts 13 and 14 is also increased or decreased a corresponding amount.

Figures 7A, 7B, 7C:
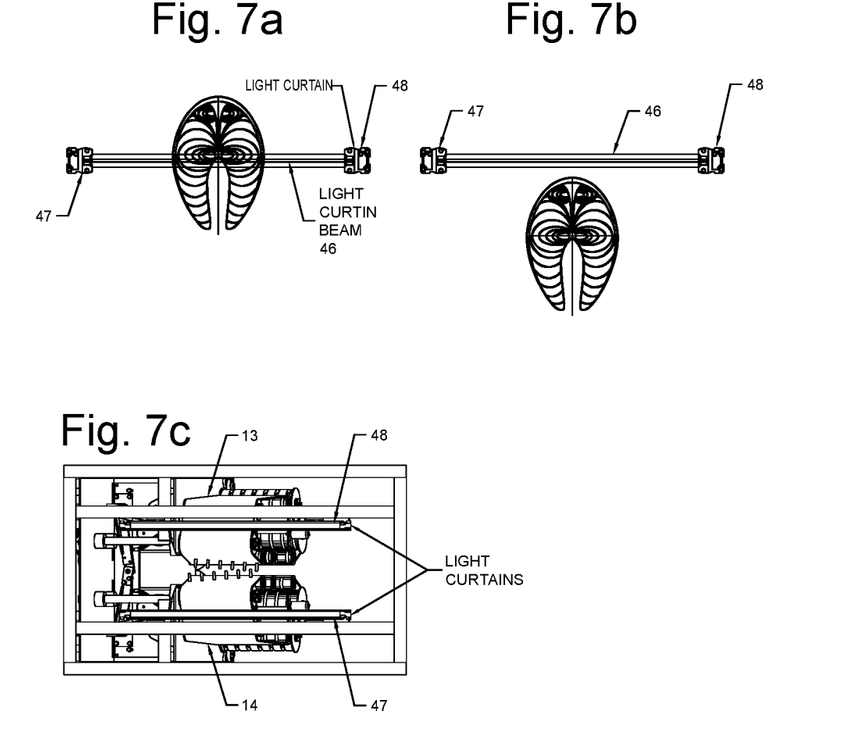
FIG. 7a is schematic end view illustrating a fish breaking a light curtain that is used to control starting and stopping of the conveyor belts.
FIG. 7b is a schematic view similar to FIG. 7a illustrating a fish positioned beneath the light curtain with the light curtain enabled and spanning the infeed zone of the fish head cutting section of the machine.
FIG. 7c is a top plan view of the infeed zone of the fish head cutting section of the machine.
Figure 7D:
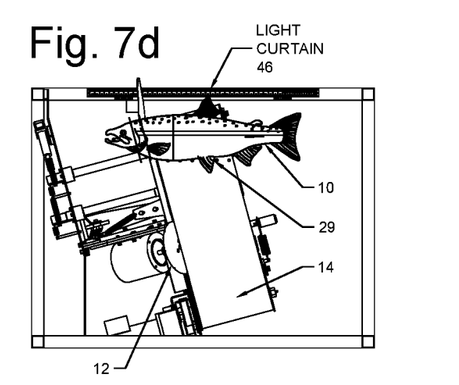
FIG. 7d is a side view of the infeed zone of the fish head cutting section of the machine.
Figure 7E:
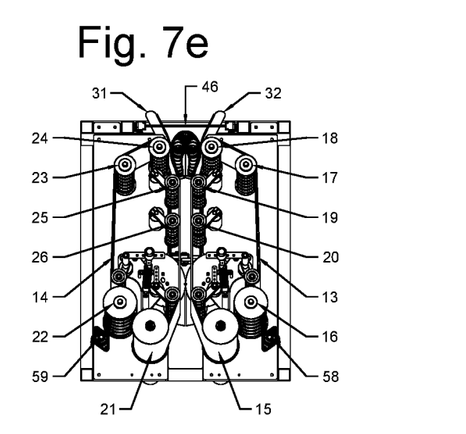
FIG. 7e is an end view of the infeed zone of the fish head cutting section of the machine.

In order to decapitate a fish, the fish is first positioned onto the bosses 27 and 29 with its gill plates, or collar bone, or pectoral fin or pelvic fin, located on guide plates 31 and 32 in an upper infeed loading zone as shown in FIGS. 4a, 7d and 7c. Thereafter, the conveying belts 13 and 14 are actuated and rotate to drive the fish over the cutting blades 11 and 12 in a sequential and cyclic operation. The belts 13 and 14 stop when the bosses 27 and 29 are rotated from their original upper positions to the original lower positions of bosses 28 and 30 which in turn are now located where bosses 27 and 29 started from. This cycle of operation is then repeated to process the next fish as well as subsequent fish. In order to control the initiation of an operating cycle, the machine 1 utilizes a light curtain 46 which is schematically illustrated in FIGS. 7a and 7b. The light curtain 46 is typically an infrared beam of light which is generated and sensed by a pair of opto-electronic devices 47 and 48. Devices 47 and 48 are mounted to the frame of machine 1 and are located above and on opposite sides of the fish loading zone as shown in FIGS. 7c, 7d and 7e. When light curtain 46 is broken, or any other interference with the light curtain 46 is sensed, a signal is generated to stop the belts 13 and 14 in the machine 1 from being actuated to rotate. Belts 13 and 14 will only run when the light curtain 46 is intact. FIG. 7e shows the fish 10 in the loading zone 60 positioned on bosses 27 and 29 and beneath the light curtain 46.

Figure 8A:
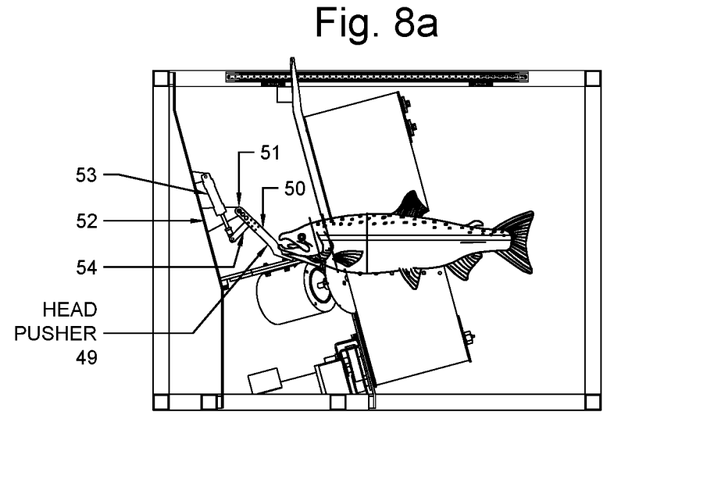
FIG. 8a is a side view in elevation illustrating a fish in the head cutting section of the machine engaging a head pusher just prior to the v-cutting blades.
Figure 8B:
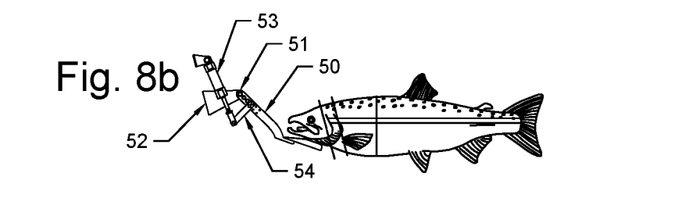
FIG. 8b is a side view similar to FIG. 8a showing only the fish and head pusher.
Figure 8C:
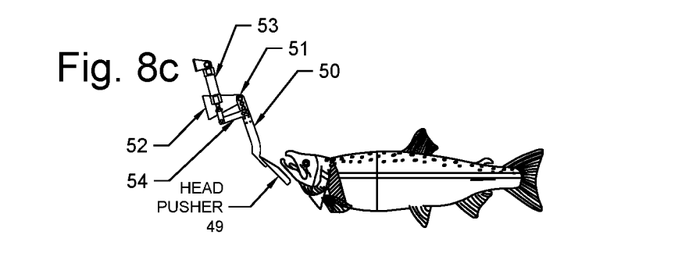
FIG. 8c is a side view similar to FIG. 8b showing the head pusher lifting the head of the fish.
Figure 8D:
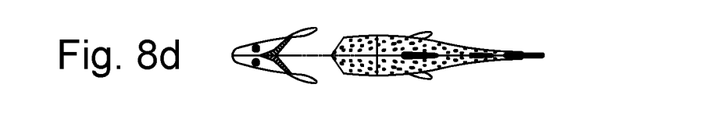
FIG. 8d is a top view of the fish of FIG. 8c showing the v-cut separating the fish's head from its body.
Figure 8E:
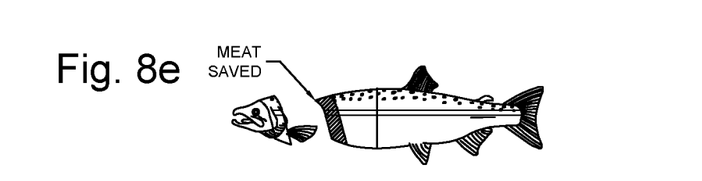
FIG. 8e is a side view of the fish of FIG. 8d illustrating via cross hatching the fish meat saved using the head pusher.

Referring now to FIGS. 8a, 8b and 8c, the head cutting section 3 of machine 1 includes a fish head pusher 49 disposed between the infeed loading zone and the head cutting zone which tips the head of a fish upwardly and rearwardly to force the meat at the top of the fish head onto the body side of the v-cut made by the blades 11 and 12 so that this meat may remain with the body of the fish, as shown in FIGS. 8d and 8e. The head pusher 49 is located above or upstream of the cutting blades 11 and 12, and is positioned to initially engage the head of a fish and tip it back when the fish is about half way through the head v-cut. The position of the head pusher 49 is adjustable as to where it engages the nose of a fish in order to tip the head back. The head pusher 49 needs to engage sooner on smaller fish and later on larger fish, and is determined by how far the fish is into the head v-cut. In order for the head to be loose at the bottom and not still attached to the bottom of the body of the fish, and so be able to be tipped back, the v-cut should be up to the backbone of the fish and the head severed from the body of the fish below its backbone to allow the head of the fish to be tipped up and back.

The head pusher 49 comprises a finger member 50 having a lower end which engages the fish and an upper end which is pivotally mounted via a pin 51 to a bracket 52 which in turn is mounted to the frame of the machine 1. In order to pivot member 50, pusher 49 includes a pneumatic cylinder 53 having its rod end connected to one end of a link member 54 which in turn has its opposite end connected to finger member 50, and its cylinder end mounted to the frame of machine 1. Thus, upon extending its rod, cylinder 53 moves the finger member 50 in a counterclockwise manner so that the lower end of finger member 50 will engage and push the head of a fish upwardly and rearwardly. Upon retracting the rod of cylinder 53, the finger member 50 pivots in a clockwise direction and thus will be disengaged from the fish head. The amount of pressure used to move the finger member 50 against the underside of the fish head, and thus tip the head backwards, can be varied and controlled depending upon the species of fish being decapitated. For example, 5-20 psi may be sufficient pressure for smaller fish while 20-30 psi may be needed for larger fish. Thus, more pressure will typically be applied for larger fish and less pressure will be applied for smaller fish.

Figure 9A:
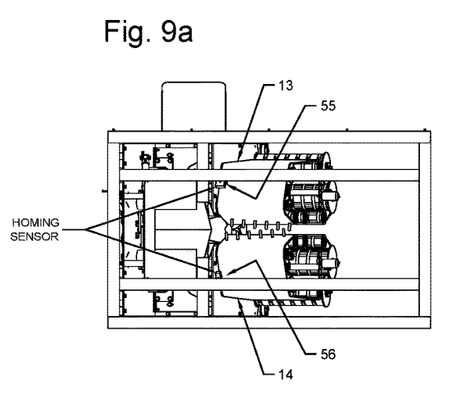
FIG. 9a is a top plan view of the head cutting section of the machine illustrating the conveyor belts and their respective homing sensors.
Figure 9B:
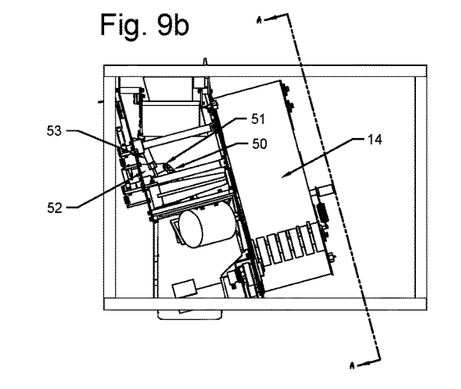
Figure 9C:
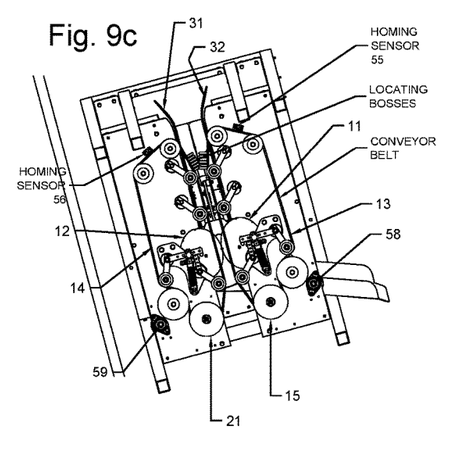
FIG. 9c is an end view of the head cutting section of the machine taken along the plane of the line A-A in FIG. 9b.

It is important that the position of the fish locating bosses 27, 28, 29 and 30 on conveying belts 13 and 14 be properly initially set in the machine 1 before an operating cycle begins so that a fish may be loaded in the upper loading zone 60 and fed in the desired horizontal orientation to the cutting blades 11 and 12. This is referred to as the "homing" position for the locating bosses 27, 28, 29 and 30 and is illustrated in FIG. 5. The homing position for bosses 27, 28, 29 and 30 is controlled via a programmable logic controller (PLC) and is determined when the bosses 27 and 28 on belt 13 are sensed by a proximity sensor 55, and when the bosses 29 and 30 on belt 14 are sensed by proximity sensor 56. As shown in FIGS. 9a, 9b and 9c, the sensors 55 and 56 are mounted to the frame of machine 1 adjacent the outer surfaces of belts 13 and 14 to sense the presence of bosses 27, 28, 29 and 30 as they pass in front of the sensors 55 and 56. Sensors 55 and 56 then generate a signal to the PLC which in turn stops the rotation of the belts 13 and 14 at the predetermined positions shown in FIG. 5.

Figure 10A:
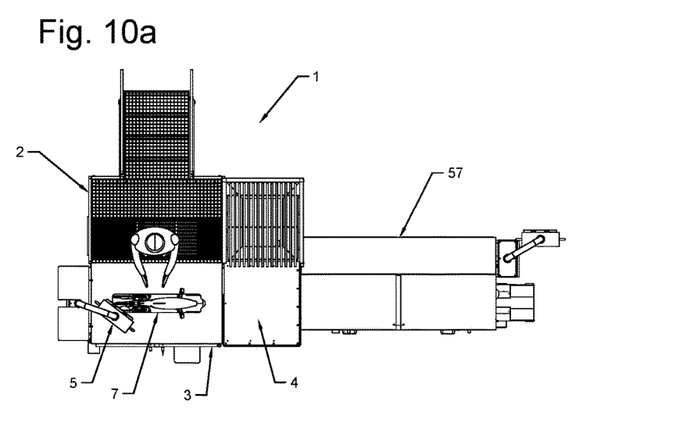
FIG. 10a is a top plan view of the fish head cutting machine shown as the initial feed station for a subsequent fish filleting machine.
Figure 10B:
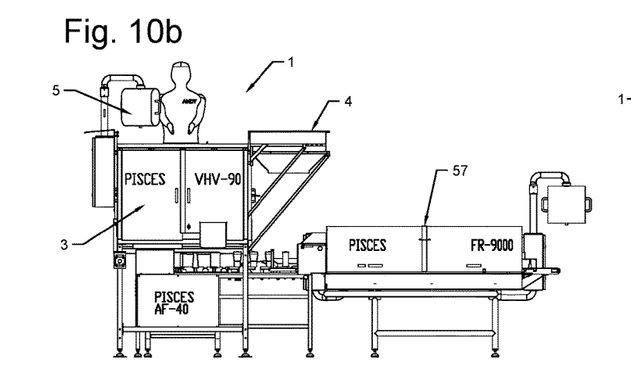
Figure 10C:
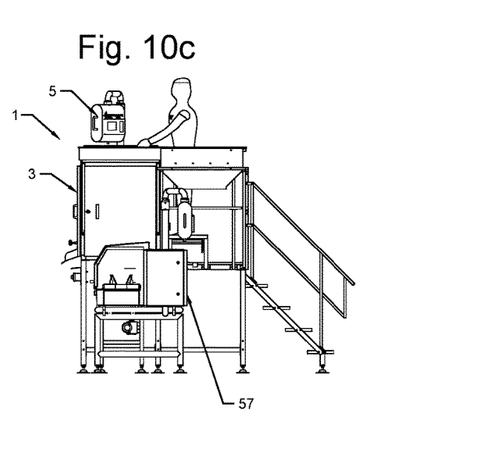

The decapitated fish exit the head cutting section 3 of the machine 1 belly side down and head end leading at a rate controlled by the PLC. This allows the fish to be fed to subsequent fish processing machines, especially to a fish filleting machine 57, as illustrated in FIGS. 10a, 10b and 10c. Thus, the feeding of decapitated fish to the fish filleting machine 57 can be readily synchronized with the head cutting machine 1 due to the ability of the PLC to control the timing and rate of decapitation in machine 1, and the orientation of the fish in and exiting machine 1.

Method of Operation

The fish head cutting machine 1 is a PLC controlled decapitating machine (See FIGS. 1a, 1b and 1c) comprising of a pair of fish conveying belts 13 and 14 that grip the entire body of the fish and carry the fish past two circular blades 11 and 12 orientated in a v-configuration. The belts 13 and 14 control the body of the fish and transport the fish at the optimum angle relative to the collar bone for minimum meat loss with removal of the head and collar bone. See FIGS. 2a-2e.

The fish are fed belly down and in a substantially horizontal orientation to the cutting blades 11 and 12. The location of the head of the fish relative to the v-cutting blades 11 and 12 is determined by the spring-loaded guide plates 31 and 32 which grip the fish at one of its anatomical body parts, such as behind its gill plates. These guide plates 31 and 32 extend vertically from the top loading zone of the machine 1 to the v-cutting circular blades 11 and 12, and are geared together to ensure the body of the fish always stays central to the v-cutting blades 11 and 12, and so the location of V-cut is in the correct location behind the collarbone irrespective of the size of the fish. See FIGS. 3a, 3b and 3c.

The fish are loaded between the static conveyor belts 13 and 14, and supported on locating bosses 27-30 which are embedded in the outer surface of the fish transport belts 13 and 14, and which ensure the body of the fish is located at the desired acute angle for presentation to the cutting blades 11 and 12. See FIGS. 4a, 4b and 4c.

The position of the location bosses 27-30 is determined by servo motors 15 and 21 based on data from encoders 58 and 59 (See FIG. 5) and the desired width setting or spacing between the belts 13 and 14 by a linear actuator 45 (See FIGS. 6a-6d) to suit a given size range of fish as programmed via a PLC. These settings are such so that when the fish is initially positioned and supported on the locating bosses 27 and 29 in the infeed loading zone, it is located between the belts 13 and 14 below a safety light curtain 46 that spans the loading zone feed opening 7 through which a fish is fed onto bosses 27 and 29 between the belts 13 and 14. See FIGS. 7a-7e. This light curtain 46 is broken as a fish is fed into the infeed loading zone of machine 1, but then when the operator removes his hand and the light curtain 46 is again complete, the conveyor belts 13 and 14 may be actuated, or indexed, so that they rotate until a second set of location bosses 28 and 30, which are 180 degrees from the location bosses 27 and 29 onto which the fish was initially located, come into the same loading position in the infeed loading zone as the original locating bosses 27 and 29. The belts 13 and 14 then stop to allow another fish to be loaded onto bosses 28 and 30. The cycle is then automatically repeated without input from the operator. The machine 1 will not run, or become activated, when the light curtain 46 is broken at any time. The distance between the light curtain 46 and the locating bosses 27 and 29 may also be varied in order to accommodate different sizes and species of fish. This is accomplished by using the homing or proximity sensors 55 and 56 to modify the final resting location of bosses 27 and 29, or 28 and 30.

As the fish moves downwardly toward the cutting blades 11 and 12 and is partially through the head cutting operation, the front of the head or nose of the fish encounters a head pusher 49 having a finger member 50 which tips the head back to force the meat at the top of the head onto the body side of the V-cut made by cutting blades 11 and 12. As a result, all required flesh remains on the body of the fish. See FIGS. 8a-8e. The amount of force or resistance on the finger member 50 is exerted by a pneumatic cylinder 53 and the amount of pressure applied by finger member 50 is controlled via the PLC such that it will tip the fish head back but then release allowing the head to be ejected from the machine 1. The control of the amount of pressure applied by finger member 50 can be varied for various fish sizes and conditions via the PLC without the need to disassemble the machine to change springs as is common practice on other machines using head pushers.

The speed of rotation of the fish conveying belts 13 and 14, and hence the operating speed of the machine 1 is programmable via the PLC to allow for synchronization with subsequent machines, such as a filleting machine 57, in the processing of fish. Such synchronization ensures correct product spacing for various sized fish to achieve maximum throughput in these subsequent machines. See FIGS. 10, 10b and 10c.

For the position of the locating bosses 27-30 to be properly set, tracked and constant, both in operation and for the belts 13 and 14 to be correctly relocated when the belts 13 and 14 are removed for cleaning, there is a "homing" position for the locating bosses 27-30. This homing position is controlled via the PLC and determined when the locating bosses 27-30 are sensed by proximity sensors 55 and 56 associated with each belt 13 and 14, respectively. See FIGS. 9a, 9b and 9c. The conveyor belts 13 and 14 have timing belt backing and are driven by timing belt rollers associated with the servo motors 15 and 21 to maintain constant relative location.

The feeding of decapitated fish to subsequent machines, such as filleting machine 57, is possible due to the controlled timing and orientation of the fish through the heading operation. The present head cutting operation delivers the fish belly down and head end leading at a rate that can be controlled and synchronized via the PLC to interface with various downstream machines. See FIGS. 10a, 10b and 10c.

We claim:

1. A fish head cutting machine for decapitating a fish, comprising:
   a) a fish support for supporting a fish in an infeed loading zone with its body belly side down and its backbone in a substantially horizontal orientation;
   b) a guide mechanism positioned adjacent said fish support to hold the fish via a fish anatomical body part so that only the body of the fish is supported by said fish support;
   c) a drive mechanism transporting the fish in a downward direction and at an acute angle to vertical from said infeed loading zone downstream to a head cutting zone while said fish is supported on said fish support and held by said guide mechanism;
   d) a head pusher located between said infeed loading zone and said head cutting zone that engages the head of the fish and tips the head of the fish upwardly and rearwardly as said fish moves downstream to said head cutting zone; and
   e) head cutting blades located downstream of the head pusher in the head cutting zone that cut the head of the fish from the body of the fish.

2. The fish head cutting machine of claim 1 wherein said fish anatomical body part is selected from the group consisting of a gill plate, a collar bone, a pectoral fin and a pelvic fin.

3. The fish head cutting machine of claim 2 wherein said fish anatomical body part is the gill plate, and the fish is selected from the group consisting of sea bass, sea bream, tilapia, cod, haddock, and striped bass.

4. The fish head cutting machine of claim 2 wherein said fish anatomical part is the collar bone, and the fish is selected from the group consisting of salmon, trout, arctic char and whitefish.

5. The fish head cutting machine of claim 2 wherein the fish anatomical part is the pectoral fin, and the fish is selected from the group consisting of cod, haddock and striped bass.

6. The fish head cutting machine of claim 1 wherein said drive mechanism includes a pair of spaced conveyor belts providing a gap corresponding to a width of a fish.

7. The fish head cutting machine of claim 6 wherein said conveyor belts are disposed in an upright orientation and at said acute angle to vertical and extend between said infeed loading zone and said head cutting zone.

8. The fish head cutting machine of claim 6 including an adjustment mechanism for changing the gap between said conveyor belts to accommodate different size fish.

9. The fish head cutting machine of claim 6 wherein said fish support comprises locating bosses projecting from said conveyor belts into the gap between said conveyor belts for supporting the body of said fish.

10. The fish head cutting machine of claim 9 wherein said drive mechanism includes proximity sensors for controlling the location of said locating bosses.

11. The fish head cutting machine of claim 1 wherein said drive mechanism includes a light curtain disposed above said infeed loading zone and said fish support to control activation and deactivation of said drive mechanism.

12. The fish head cutting machine of claim 1 including a pneumatic control for said head pusher.

13. The fish head cutting machine of claim 12 wherein said pneumatic control includes a pneumatic cylinder for controlling the amount of air pressure applied to said head pusher.

14. The fish head cutting machine of claim 1 wherein said guide mechanism includes a pair of opposing spring-biased L-shaped guide members that are movable between an open fish non-gripping position and a closed fish gripping position that engages said fish anatomical body part.

15. A method of decapitating a fish, comprising the steps of:
   a) supporting a fish in an infeed loading zone on a fish support with its belly side down and its backbone in a substantially horizontal orientation;
   b) guiding the fish by gripping the fish via a fish anatomical body part so that only the body of the fish is supported by the fish support;
   b) driving the fish in a downward direction and at an acute angle to vertical from said infeed loading zone downstream to a head cutting zone while said fish is held by its anatomical body part and supported by said fish support;
   c) pushing the head of the fish upwardly and rearwardly as the fish travels downstream from the infeed loading zone to the head cutting zone; and
   d) cutting the head of the fish from the body of the fish in the heads cutting zone.

16. The method of decapitating a fish of claim 15 wherein the step of gripping the fish via a fish anatomical body part comprises gripping the fish by its gill plate, collar bone, pectoral fin or pelvic fin.

17. The method of decapitating a fish of claim 15 comprising pneumatically controlling the pushing of the head of the fish.

18. The method of decapitating a fish of claim 17 comprising varying the amount of pneumatic pressure applied to the head of a fish according to the size and species of the fish.

19. The method of decapitating a fish of claim 15 comprising controlling the activation and deactivation of driving the fish downstream by using a light curtain disposed above said infeed loading zone.

20. The method of decapitating a fish of claim 19 comprising controlling the distance between the light curtain and the fish support in the infeed loading zone in order to accommodate the size and species of fish.

\* \* \* \* \*